US008820842B2

(12) United States Patent
Uebelacker et al.

(10) Patent No.: US 8,820,842 B2
(45) Date of Patent: Sep. 2, 2014

(54) VEHICLE SEAT WITH A SUPPORT STRUCTURE

(75) Inventors: Roland Uebelacker, Pfreimd (DE);
Johann Deml, Thanstein (DE); Sergej Schustjew, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 145 days.

(21) Appl. No.: 13/427,649

(22) Filed: Mar. 22, 2012

(65) Prior Publication Data
US 2012/0261972 A1 Oct. 18, 2012

(30) Foreign Application Priority Data
Mar. 28, 2011 (DE) .......................... 10 2011 015 364

(51) Int. Cl.
*A47C 7/02* (2006.01)
*B60N 2/68* (2006.01)
(52) U.S. Cl.
CPC . *B60N 2/68* (2013.01); *B60N 2/688* (2013.01)
USPC ................. 297/452.18; 297/452.2; 297/451.2
(58) Field of Classification Search
CPC .......... B60N 2/68; B60N 2/015; B60N 2/688; B60N 2/682; B60N 2/242; A47C 9/105
USPC ........ 297/452.14, 452.2, 452.1, 216.1, 451.2, 297/451.28
See application file for complete search history.

(56) References Cited

U.S. PATENT DOCUMENTS

| 1,885,630 | A | * | 11/1932 | Ronan ........................ 297/446.1 |
| 2,118,456 | A | | 5/1938 | Whedon |
| 3,300,203 | A | | 1/1967 | Carter et al. |
| 3,704,767 | A | | 12/1972 | Takagi |
| 3,706,362 | A | | 12/1972 | Faure |
| 3,711,153 | A | * | 1/1973 | Cunningham ........... 297/344.14 |
| 3,752,432 | A | | 8/1973 | Lowe |
| 4,151,973 | A | | 5/1979 | Sedlock |
| 4,192,545 | A | * | 3/1980 | Higuchi et al. .......... 297/216.13 |
| 4,213,594 | A | | 7/1980 | Pietsch et al. |
| 4,286,765 | A | | 9/1981 | Delgleize et al. |
| 4,350,317 | A | | 9/1982 | Aondetto |
| 4,408,744 | A | | 10/1983 | Thompson |
| 4,451,079 | A | | 5/1984 | Takahashi |

(Continued)

FOREIGN PATENT DOCUMENTS

| CN | 100493951 C | 6/2009 |
| DE | 1 898 307 U | 8/1964 |

(Continued)

OTHER PUBLICATIONS

European Search Report for European Patent Application No. 12 159 863.5, mailed Jul. 10, 2013.

(Continued)

*Primary Examiner* — Sarah B McPartlin
(74) *Attorney, Agent, or Firm* — Lathrop & Gage LLP (57) ABSTRACT

The invention relates to a vehicle seat with a seat part, with a backrest and with a support structure for supporting the seat part as well as the backrest, in which the support structure is capable of being fastened to a bodywork component and in which forces acting upon the vehicle seat by means of the support structure are capable of being introduced into the bodywork component, and in which the support structure has an asymmetrical framework with main force braces extending substantially vertically.

13 Claims, 5 Drawing Sheets

(56) References Cited

U.S. PATENT DOCUMENTS

| | | | |
|---|---|---|---|
| 4,477,050 A | 10/1984 | Thompson et al. | |
| 4,573,657 A | 3/1986 | Sakamoto | |
| 4,645,169 A | 2/1987 | Mischer | |
| 4,679,760 A | 7/1987 | Dotzler et al. | |
| 4,684,100 A | 8/1987 | Grassl | |
| 4,729,539 A | 3/1988 | Nagata | |
| 4,773,671 A | 9/1988 | Inagaki | |
| 4,784,434 A | 11/1988 | Iwami | |
| 4,856,763 A | 8/1989 | Brodersen et al. | |
| 4,943,037 A | 7/1990 | Brodersen et al. | |
| 4,961,482 A | 10/1990 | Pohlenz et al. | |
| 4,993,778 A | 2/1991 | Colin et al. | |
| 5,058,852 A | 10/1991 | Meier et al. | |
| 5,125,631 A | 6/1992 | Brodersen et al. | |
| 5,211,369 A | 5/1993 | Hoemer | |
| 5,251,864 A | 10/1993 | Itou | |
| 5,310,247 A * | 5/1994 | Fujimori et al. | 297/378.12 |
| 5,364,060 A | 11/1994 | Donovan et al. | |
| 5,447,360 A * | 9/1995 | Hewko et al. | 297/452.18 |
| 5,521,821 A | 5/1996 | Shimizu et al. | |
| 5,533,703 A | 7/1996 | Grassl et al. | |
| 5,553,911 A | 9/1996 | Bodin et al. | |
| 5,582,385 A | 12/1996 | Boyle et al. | |
| 5,735,509 A | 4/1998 | Gryp et al. | |
| 5,765,802 A | 6/1998 | Bostrom et al. | |
| 5,791,738 A | 8/1998 | Niezoldt | |
| 5,794,911 A | 8/1998 | Hill | |
| 5,871,198 A | 2/1999 | Bostrom et al. | |
| 5,957,426 A | 9/1999 | Brodersen | |
| 5,967,604 A | 10/1999 | Yoshida et al. | |
| 5,971,116 A | 10/1999 | Franklin | |
| 6,042,093 A | 3/2000 | Garelick | |
| 6,231,119 B1 * | 5/2001 | Zheng | 297/16.2 |
| 6,340,201 B1 | 1/2002 | Higuchi | |
| 6,478,102 B1 | 11/2002 | Puterbaugh et al. | |
| 6,543,755 B2 | 4/2003 | Monson et al. | |
| 6,616,116 B1 | 9/2003 | Rochau et al. | |
| 6,637,735 B2 | 10/2003 | Monson et al. | |
| 6,763,550 B2 | 7/2004 | Regnier | |
| 6,802,408 B2 | 10/2004 | Krammer | |
| 7,044,553 B2 | 5/2006 | Ropp | |
| 7,152,839 B2 | 12/2006 | Mullinix et al. | |
| 7,168,671 B2 | 1/2007 | Bostrom et al. | |
| 7,185,867 B2 | 3/2007 | Hill et al. | |
| 7,377,533 B2 | 5/2008 | Takeuchi et al. | |
| 7,712,836 B2 | 5/2010 | Deml | |
| 7,810,884 B2 | 10/2010 | Lorey et al. | |
| 7,886,882 B2 | 2/2011 | Behmenburg et al. | |
| 7,942,248 B2 | 5/2011 | St. Clair et al. | |
| 8,118,287 B2 | 2/2012 | Schordine | |
| 8,457,841 B2 | 6/2013 | Knoll et al. | |
| 2001/0035600 A1 | 11/2001 | St. Clair | |
| 2006/0243548 A1 | 11/2006 | Stein et al. | |
| 2006/0278805 A1 | 12/2006 | Haller | |
| 2007/0278723 A1 | 12/2007 | Shoemaker et al. | |
| 2008/0000738 A1 | 1/2008 | Zdeb | |
| 2008/0000739 A1 | 1/2008 | Behmenburg et al. | |
| 2008/0088165 A1 | 4/2008 | Deml | |
| 2008/0156602 A1 | 7/2008 | Hiemenz et al. | |
| 2008/0197684 A1 | 8/2008 | Ott et al. | |
| 2009/0134595 A1 | 5/2009 | Haller et al. | |
| 2009/0179390 A1 | 7/2009 | Wurmthaler et al. | |
| 2009/0184448 A1 | 7/2009 | Hiser | |
| 2009/0256293 A1 | 10/2009 | Ward | |
| 2009/0283944 A1 | 11/2009 | Schordine | |
| 2010/0052356 A1 | 3/2010 | Lewis, II | |
| 2010/0072685 A1 | 3/2010 | Golpe et al. | |
| 2010/0072800 A1 | 3/2010 | Weber et al. | |
| 2010/0102493 A1 | 4/2010 | Deml et al. | |
| 2010/0117428 A1 | 5/2010 | Deml et al. | |
| 2011/0001033 A1 | 1/2011 | Kohl et al. | |
| 2011/0001342 A1 | 1/2011 | Deml et al. | |
| 2011/0022265 A1 | 1/2011 | Sekiya | |
| 2011/0226930 A1 | 9/2011 | Enns et al. | |
| 2011/0278894 A1 | 11/2011 | Lorey | |
| 2012/0025577 A1 | 2/2012 | Kolb | |
| 2012/0043798 A1 | 2/2012 | Haller et al. | |
| 2012/0049421 A1 | 3/2012 | Haller et al. | |
| 2012/0086159 A1 | 4/2012 | Kolb | |
| 2012/0090930 A1 | 4/2012 | Haller | |
| 2012/0091773 A1 | 4/2012 | Lorey | |
| 2012/0126592 A1 | 5/2012 | Kaessner et al. | |
| 2012/0153689 A1 | 6/2012 | Haller et al. | |
| 2012/0153695 A1 | 6/2012 | Haller et al. | |
| 2012/0187615 A1 | 7/2012 | Haller et al. | |
| 2012/0261976 A1 * | 10/2012 | Uebelacker et al. | 297/464 |

FOREIGN PATENT DOCUMENTS

| | | |
|---|---|---|
| DE | 1 555 056 | 3/1970 |
| DE | 15 55 056 | 3/1970 |
| DE | 19 16 403 A1 | 10/1970 |
| DE | 2022021 | 11/1970 |
| DE | 2 113 579 | 10/1972 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 35 17 345 A1 | 11/1986 |
| DE | 3813402 | 11/1989 |
| DE | 38 24 272 A1 | 3/1990 |
| DE | 41 01 221 A1 | 7/1992 |
| DE | 9402417 | 4/1994 |
| DE | 696 06 732 T2 | 4/1995 |
| DE | 197 56 252 A1 | 7/1998 |
| DE | 197 41 602 A1 | 3/1999 |
| DE | 603 20 456 T2 | 12/2002 |
| DE | 699 08 290 | 5/2004 |
| DE | 10347219 | 5/2005 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 602005001868 | 12/2007 |
| DE | 10 2007 030 467 A1 | 1/2009 |
| DE | 102008040011 | 5/2009 |
| DE | 10 2008 016 685 B3 | 6/2009 |
| DE | 10 2008 010 719 A1 | 8/2009 |
| DE | 10 2008 045 492 A1 | 3/2010 |
| DE | 10 2008 052 960 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | 63220026 A | 9/1988 |
| JP | 1237471 A | 9/1989 |
| JP | 09136611 | 5/1997 |
| JP | 2007 062 539 A | 3/2007 |
| WO | WO 2004/110808 | 12/2004 |

OTHER PUBLICATIONS

Office Action for German Patent Application No. 10 2010 048 210.2, mailed Jul. 7, 2011.

Office Action for German Patent Application No. 10 2010 055 342.5, mailed Oct. 6, 2011.

Office Action for German Patent Application No. 10 2010 051 325.3, mailed Oct. 10, 2011.

Extended European Search Report for parallel European Patent Application No. 11 19 5031, mailed Apr. 5, 2012.

(56) References Cited

OTHER PUBLICATIONS

Office Action for German Patent Application No. 10 2010 055 344.1, mailed Oct. 5, 2011.
Examination Report dated Aug. 24, 2012, from the German Patent Office for German Patent Application No. 10 2010 026 569.1.
First Office Action dated Mar. 29, 2012 for Chinese Patent Application No. 201010244916.3.
First Office Action dated Mar. 29, 2012 for Chinese Patent Application No. 201010244916.3, English translation.
Office Action, Chinese Patent Application No. 201110052443.1, dated Dec. 30, 2012.
Office Action, Chinese Patent Application No. 201110052443.1, dated Dec. 30, 2012, English Translation.
Extended European Search Report for parallel European Patent Application No. 11 19 5039, mailed Apr. 5, 2012.
Examination Report for German Patent Application No. 10 2011 009 530.6 dated May 4, 2012.
Extended European Search Report for European Patent Application No. 12 15 9863, dated Jul. 4, 2012.
Search Report for European Patent Application No. 11177689.4, mailed Dec. 14, 2011.
Office Action for German Patent Application No. 10 2010 035 888.6 mailed Jun. 9, 2011.
Office Action corresponding to German Patent Application No. 102010045114.2, completed Nov. 8, 2013.
Office Action for German Patent Application No. 10 2011 015 364.0, mailed Feb. 6, 2012.

* cited by examiner

VEHICLE SEAT WITH A SUPPORT STRUCTURE

CROSS-REFERENCE TO RELATED APPLICATION

This application claims the benefit of priority from German Patent Application No. 10 2011 015 364.0, filed Mar. 28, 2011, which is hereby incorporated by reference in its entirety.

DESCRIPTION

The invention relates to a vehicle seat with a seat part, with a backrest and with a support structure for supporting the seat part as well as the backrest, in which the support structure is capable of being fastened to a bodywork component and in which forces acting upon the vehicle seat by means of the support structure are capable of being introduced into the bodywork component.

Vehicle seats of the generic type are adequately known from the prior art. In particular, in motor vehicles or utility motor vehicles, such as tractors or the like, vehicle seats are made more robust in order to be able to meet tougher conditions of use of these vehicles. In general, however, a reduction in weight as a whole is desired even in vehicles of this type.

In this respect the object of the present invention is to be able to construct vehicle seats of the generic type with a reduction in weight, without aspects relating to comfort and/or relating to safety having to be ignored in this case.

In accordance with a first aspect of the invention the object of the invention is attained by a vehicle seat with a seat part, with a backrest and with a support structure for supporting the seat part as well as the backrest, in which the support structure is capable of being fastened to a bodywork component and in which forces acting upon the vehicle seat by means of the support structure are capable of being introduced into the bodywork component, the vehicle seat being characterized in that the support structure has an asymmetrical framework with main force braces extending substantially vertically, in which on the top side of the support structure the main force braces converge in the junction region and on the underside of the support structure a first one of the main force braces is arranged on the side of the junction region as a thrust brace guided forwards as far as a front foot of the support structure, a second one of the main force braces is arranged on the side of the junction region as a tension brace at the rear guided as far as a first rear foot of the support structure and a third one of the main force braces is arranged as a tension/thrust brace at the rear guided as far as a further rear foot of the support structure.

As a result of this guidance—according to the invention—of these three main force braces, the support structure of the vehicle seat can be designed to be unusually light in terms of weight, since essentially only the front one of the main force braces has to be made particularly stable in order to have to be up to the forces which act upon the vehicle seat in particular in the event of a crash.

In an advantageous manner, in particular the rear main force brace on the side of the junction region can be made less stable on account of the framework designed according to the invention, so that a satisfactory reduction in weight can be achieved on the vehicle seat by this alone.

In addition, the third main force brace can also be designed to be reduced in weight with respect to the first main force brace, since like the second main force brace it too is less heavily stressed in particular in the event of a crash than the main force brace guided forwards here.

It is to be understood that the support structure can comprise further structural braces which all need be less solid or of less high quality, however, than the main force braces described here.

With respect to a first embodiment of the invention, it is advantageous for the first main force brace to be arranged, in particular above the seat part, extending to a point in front of the backrest and to be arranged laterally on or adjacent to the seat part.

As a result of this, it is possible for regions of the support structure which in particular absorb main forces and which are therefore particularly important to be situated very far into the front region of the vehicle seat, as a result of which a support of the vehicle seat optimized in terms of forces can be achieved with respect to the chassis component.

Cumulatively it is advantageous for the support structure to have main force braces, in which at least one of the main force braces is arranged laterally on or adjacent to the seat part.

Both of the last-named combinations of features are advantageous in particular on the side of a belt mounting, since on this side of the belt mounting restraining forces are introduced into the support structure of the present vehicle seat very far towards the top.

In order to be particularly well protected from an uncontrolled buckling of the main force braces even in the face of very high loading, it is extremely advantageous for the first main force brace in particular to be curved and to be made bulbous in the sitting direction.

A defined pre-determined bending point can be produced in an advantageous manner with a curved main force brace.

In particular, the risk of uncontrolled buckling in the transverse direction, i.e. transversely to the sitting direction of a person, can be reduced by a purposeful anchoring in accordance with the arch principle.

In addition, it is consequently also advantageous for the second main force brace to be made bulbous in the sitting direction.

In an advantageous manner the second main force brace is arranged behind the seat part, as a result of which it can satisfactorily absorb forces specifically acting vertically upon the vehicle seat.

The support structure can be supported over a wide area in the present case on a base if the third main force brace is arranged transversely behind the seat part as viewed in the sitting direction.

As a result of this the present vehicle seat can also be advantageously supported laterally by the framework according to the invention.

In this way, an advantageous three-leg framework can be formed on a vehicle seat by means of the present asymmetrical framework, so that it is possible to dispense with a further main force brace guided forwards.

By way of example this could not be carried out starting from the junction region at the top, since the seat part with the seat region is situated between the junction region and an opposed further front support structure foot of the vehicle seat.

A preferred embodiment variant provides further that the third main force brace is arranged supported on the side of the foot region on a triangle arrangement comprising further support structure braces.

By means of this triangle arrangement a first important further distribution of the support structure braces on the asymmetrical framework can be achieved.

In addition, in order to be able to design the support structure with a further reduction in weight, it is extremely advantageous for a front vertical brace of the triangle arrangement to be arranged orientated vertically towards the front from the further rear support structure foot and in particular to support a horizontal brace of the triangle arrangement.

Cumulatively it is advantageous for a horizontal brace of the triangle arrangement to extend from a rear vertical brace of the triangle arrangement to a further foot of the support structure.

As a result of the latter, a highly advantageous stabilization of the support structure can be achieved.

In particular, beside a support on the first main force brace a front support device of the seat part can be additionally supported on this horizontal brace.

Figure 3:
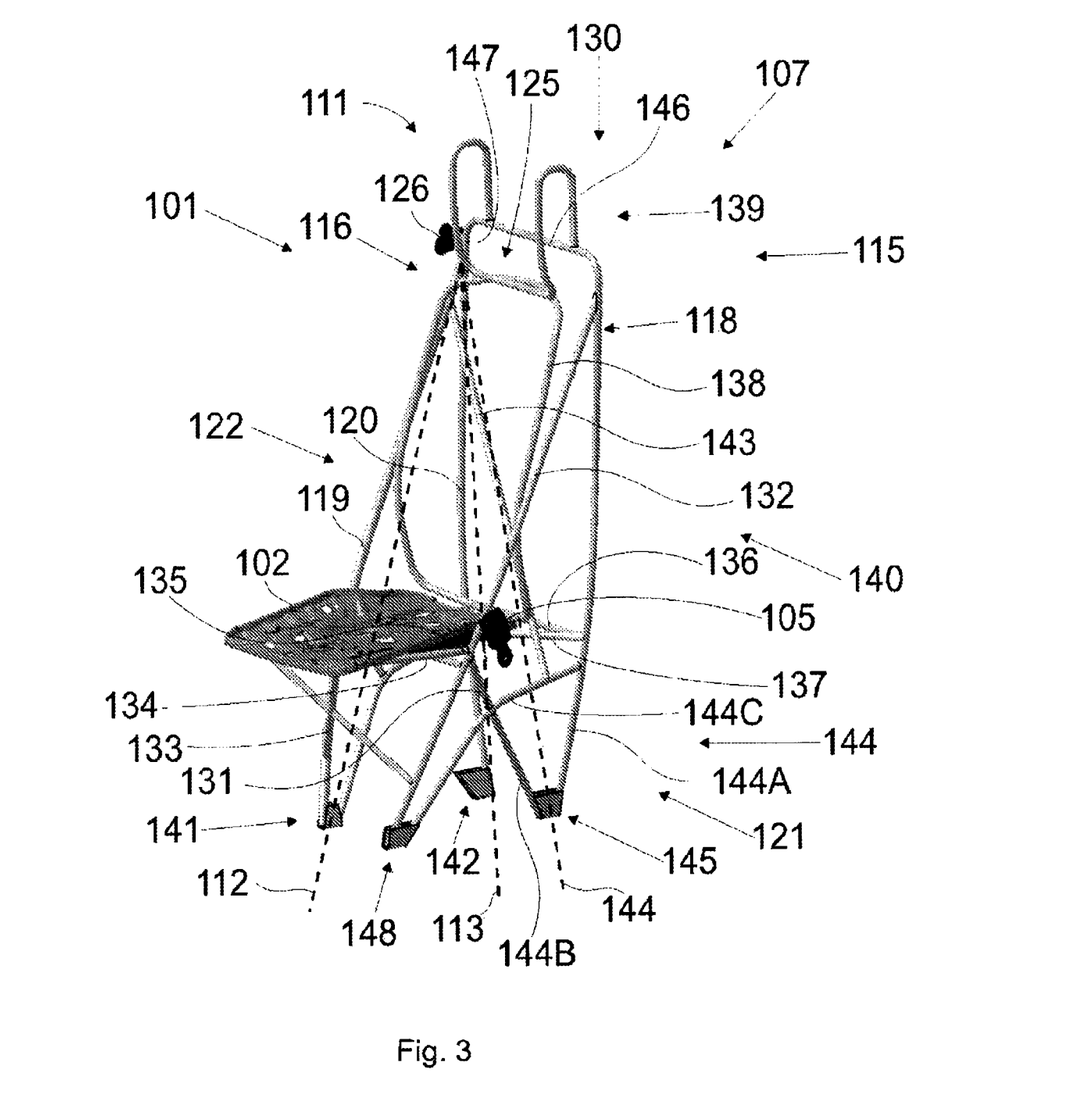
FIG. 3 is a diagrammatic perspective view of another support structure of a seat of a motor vehicle comprising an asymmetrical framework with more than one curved main force brace.
Figure 4:
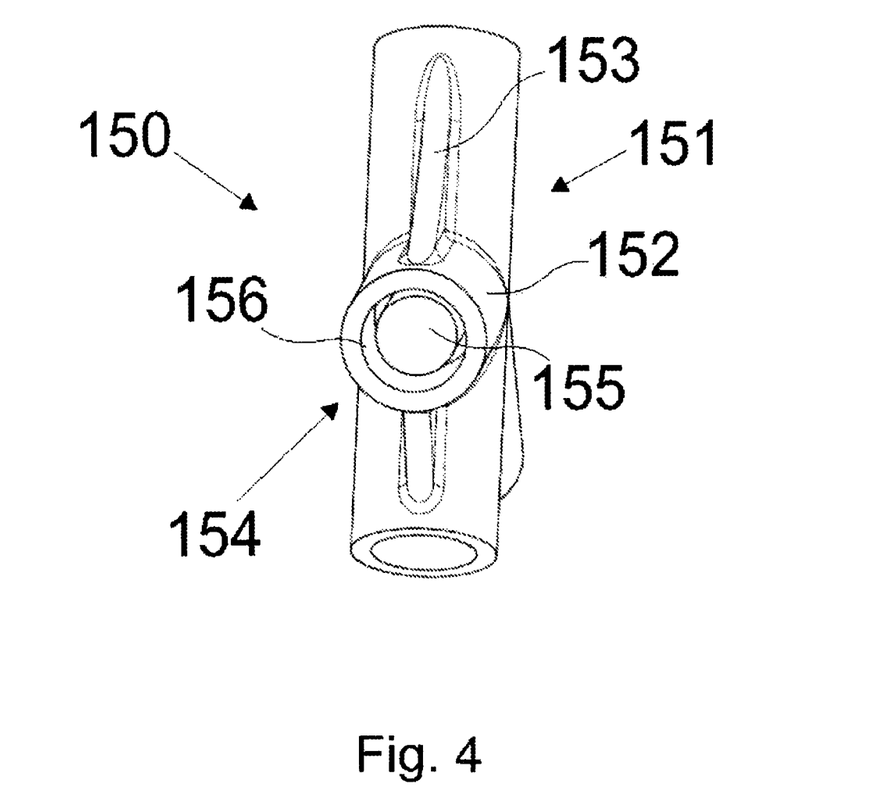
FIG. 4 is a diagrammatic view of a connecting device with a junction fitting comprising four receiving means for structural braces of a guiding device of the main forces.

Further advantageous support structure brace patterns are described in particular with reference to the embodiment shown in FIG. 3 and the further embodiment shown in FIG. 4.

In order to be able to reduce further the risk of buckling, in particular of the front main force brace, it is advantageous for the three main force braces to be additionally directly connected to one another by means of a triangle connection. As a result, forces arising on the support structure can be more advantageously divided between the individual main force braces.

It is to be understood that a triangle connection of this type can exist in various forms. A triangular junction plate preferably in the form of a triangular metal sheet frame or a triangular structure of individual rods is preferred.

If the triangle connection is provided below the junction region, the pressure-loaded free length of the main force braces in particular can be advantageously reduced.

In this respect it is advantageous for the triangle connection to be provided in a region which is situated barely above the seat part and/or barely behind the backrest of the vehicle seat.

In accordance with a further aspect the object of the invention is also attained by a vehicle seat with a seat part, with a backrest and with a support structure for supporting the seat part as well as the backrest, in which the support structure is capable of being fastened to a bodywork component and in which forces acting upon the vehicle seat by means of the support structure are capable of being introduced into the bodywork component, the vehicle seat being characterized in that the support structure has a guiding device of the main forces with main force braces extending substantially vertically and with lines of action of the main forces extending substantially vertically, in which on the top side of the support structure the lines of action of the main forces extending substantially vertically are arranged converging in a junction region of the guiding device of the main forces and on the underside of the support structure they are arranged at a further distance from one another than in the junction region.

As a result of the fact that the support structure according to the invention has a guiding device of the main forces with such a pattern of the lines of action of the main forces, the support structure can be designed locally for loads which actually occur and, in this way, it can be constructed more in accordance with requirements, as a result of which the vehicle seat can be made with a greater reduction in weight as a whole.

In addition, with the present invention a wide spatial separation of the tensile and thrust stresses is achieved, so that essentially only tensile and thrust forces have to be dealt with by the support structure as the main forces which occur. Critical concentrations of forces or respectively disadvantageous moments can be reduced to a negligible degree in an advantageous manner.

The term "guiding device of the main forces" covers any device by means of which forces acting upon the vehicle seat can be introduced into the bodywork component of a vehicle.

It is to be understood that the guiding device of the main forces can be constructed both by means of structural braces extending horizontally or vertically and by means of structural braces orientated between them, provided that the structural braces provided make it possible for lines of action of the main forces extending substantially vertically to be achieved with respect to the support structure.

In addition, a support structure designed in this way makes it possible for the seat part provided and the backrest provided to need to satisfy only the force requirements of a person sitting in the present vehicle seat, as a result of which the vehicle seat can be produced with a further reduction in weight in an advantageous manner.

In the sense of the invention the terms "on the top side" and "on the underside" describe both regions of the vehicle seat or the support structure in question respectively and regions outside the vehicle seat or the support structure thereof respectively.

This means in the present case that the lines of action of the main forces extending substantially vertically can also meet or be bunched outside the physical structure of the vehicle seat.

It is preferable for the junction region to be arranged in the upper third of the support structure or the vehicle seat respectively, so that the support structure can be made as slim as possible there.

Ideally, the junction region comprises a corner region of the support structure or the vehicle seat respectively, so that the corner region can be formed directly by the junction region itself structurally. As a result, a further reduction in weight can be achieved.

If, in particular, the lines of action of the main forces extending substantially vertically are arranged at a greater distance from one another on the underside of the support structure than on the top side of the support structure, an asymmetrical pattern of the main forces with respect to the support structure occurs, as a result of which structural braces of regions of the support structure which are subjected to less load can be produced with a greater reduction in weight.

In addition, the introduction of forces into the bodywork component can be designed to be less loading, in particular for the bodywork component, if the lines of action of the main forces extending substantially vertically are arranged at a greater distance from one another on the side of the vehicle seat facing the bodywork component.

As a result, in particular, even an advantageous triangle of forces can be produced on the present support structure, a triangle of forces of this type providing a particularly good opportunity to introduce forces acting upon the vehicle seat into the bodywork component.

A bodywork component in this respect can be designed for example in the form of the floor of a driver's cab or passenger compartment of a vehicle in this case.

A further preferred embodiment variant provides that the guiding device of the main forces comprises a framework which is made asymmetrical and in which the lines of action of the main forces extending substantially vertically are arranged so as to converge more closely together on the top side of the support structure than on the underside of the support structure.

As a result of the framework made asymmetrical in this way, the guiding device of the main forces can be designed to meet the requirements particularly satisfactorily with respect to the forces in action.

In this respect the necessary support structure of the vehicle seat can be implemented in a particularly simple manner structurally if the guiding device of the main forces has a framework with main force braces in which on the top side of the support structure the main force braces converge in the junction region and on the underside of the support structure are arranged at a greater distance from one another than in the junction region.

It is to be understood that the guiding device of the main forces can be implemented physically in different structural ways. Structurally, it is extremely simple for the guiding device of the main forces to be implemented with a three-leg framework.

It is preferable for structural braces—defined by the three-leg framework—of the guiding device of the main forces to converge in the junction region of the support structure.

In this respect it is easy to see that by means of the three-leg framework the lines of action of the main forces extending substantially vertically can be orientated in a structurally simple manner so as to converge at the top side of the support structure and to diverge on the underside of the support structure.

A particularly preferred embodiment variant provides that the junction region comprises a holding device for a belt mounting.

The belt mounting in this case is essentially a component of a belt restraining system which is preferably integrated completely in the vehicle seat, the belt mounting of the junction region being capable of comprising a belt store or a belt reversal means.

In this respect restraining forces acting upon the belt mounting in the event of an activation of the belt restraining system can be introduced directly into the support structure and further into the bodywork component whilst avoiding the backrest in an advantageous manner with respect to a person sitting in the vehicle seat.

As a result, a further reduction in weight can be achieved in particular on the present vehicle seat.

In particular, the three-leg framework with its upper junction region is particularly suitable for receiving the belt mounting, since restraining forces can be introduced into the bodywork component in an extensive manner by way of the three-leg framework.

In the case of conventional vehicle seats with an integrated belt mounting it happens as a rule that restraining forces of this type first act upon a backrest structure before they can possibly be introduced into a bodywork component by way of a support structure. In this case a deflection of the restraining forces by way of an adjustment mechanism of the angle of inclination between the backrest and a seat part is usually barely necessary.

In the present case it is possible to dispense with this in an advantageous manner. In this respect the features with respect to the present belt mounting advantageously further develop conventional vehicle seats even without the remaining features of the invention.

It is to be understood that the structural braces and, in particular, the main force braces of the support structure can be designed in numerous ways.

In this respect it should be mentioned at this point that it is likewise particularly advantageous for the guiding device of the main forces to have a framework with main force braces, in which in particular the main force braces have different cross-sectional profiles.

In this way, the main force braces can have for example an oval profile or an open-C profile or the like.

In order to be able to adapt the support structure more advantageously to the different aspects of the task, it is advantageous for a first main force brace of the guiding device of the main forces to be designed essentially in the form of a thrust rod, for a second main force brace to be designed essentially in the form of a tension rod and/or for a third main force brace to be designed essentially in the form of a tension/thrust rod.

It is preferable for the first or the third main force brace respectively, as viewed in the sitting direction, to be designed in the form of a thrust rod, since it is primarily acted upon with pressure, in particular when the belt restraining system is activated.

The main force brace on the side of the belt mounting is preferably more strongly dimensioned than the other structural braces.

In addition, the risk of uncontrolled buckling in the transverse direction, i.e. transversely to the sitting direction of a person, can be reduced by a purposeful anchoring in accordance with the arch principle.

In this respect it is advantageous for the front main force brace to be selected to be of higher quality with respect to the material and/or the profile as compared with the other structural braces, so as also to reduce the risk of buckling or to prevent it altogether. In this case, in particular, an oval tube or even a hydroformed tube is suitable.

In general, with respect to the structural braces tube thicknesses of from 10 mm to 30 mm and tube wall thicknesses of from 0.8 mm to 3 mm are preferably recommendable, in which case it is additionally also possible to differentiate between the thrust tubes and tension tubes in order to achieve an improved reduction in weight.

In addition, completely solid tension rods with a diameter of from 2 mm to 8 mm can also be used, in order to improve further the distribution of force at the support structure.

By way of example, with respect to the three-leg framework explained above it is advantageous for a steel with the quality of material of S 355 or Qst 420 to be used, at least the main force brace on the side of the belt mounting having ideally a diameter of from 20 mm to 35 mm and a wall thickness of from 0.8 mm to 3 mm.

With respect to a high-grade steel design the values can be 21.3 mm with respect to the diameter and from 1 mm to 2 mm with respect to the wall thickness.

In the case of a high-strength dual phase steel DP600/DP800 with a yield strength of from 550 MPa to 800 MPa, diameters of from 10 mm to 22 mm and wall thicknesses of from 0.8 mm to 2 mm are preferably selected.

In the case of a high-strength aluminium with a yield strength of from 260 MPa to 360 MPa, the values are preferably selected to be slightly greater again with from 22 mm to 35 mm with respect to the diameter and from 1 mm to 3 mm with respect to the wall thickness.

Structural braces extending transversely on the vehicle seat, such as for example the third diagonally extending main force brace mentioned above, are ideally provided as the thrust/tension rod and they can be designed to have a slightly lower quality in particular with respect to the diameter, the quality of material, the thickness of material and/or the profiling.

The second main force brace described above, which essentially represents a tension rod, can be designed to be less complicated since with this there is no risk of buckling.

A production process of the present support structure or the guiding device of the main forces respectively can be arranged in an advantageous manner if the support structure has a plurality of structural braces and at least one connecting device for them, the connecting device comprising at least one receiving space for one of the structural braces and a vertical connecting mandrel being arranged in a projecting manner into the receiving space.

With this type of design the—in particular—intimate connecting possibility of the connecting device with the respective structural brace is advantageous, in particular in contrast to connecting devices with simple through holes. In this respect the connecting device provides advantageous sleeves for connecting the structural braces.

It is preferable for the vertical connecting mandrel to be set back slightly behind the plane of the opening of the receiving space, so that material can be saved.

The connecting mandrel can in this case comprise a hollow mandrel, so that here too it is possible to save weight.

A preferred embodiment variant in this respect provides that the receiving space forms an annular cylinder. As a result, a particularly intimate join between the connecting device and one of the structural braces can be produced.

If the annular cylinder is filled with an adhesive before the insertion of a structural brace, in accordance with the displacement principle the adhesive can ideally cover for example a tube of the structural brace on the inside and the outside in a uniform manner, as a result of which the adhesive surface can be increased by approximately the double. As a result of this design, the necessary depth of insertion or respectively a length of the connecting device in this respect can be reduced by approximately the half.

Since a further reduction in weight can likewise be achieved in particular by the connecting device proposed here, the features in conjunction with the connecting device are advantageous even without the other features of the invention.

In addition, if the junction region comprises a junction fitting for connecting, in particular, main force braces of the guiding device of the main forces, in which case the junction fitting has at least one receiving means with an internal space for the arrangement of an end of a main force brace and a connecting mandrel projecting into the internal space, then in particular the junction region of the present support structure or the guiding device of the main forces respectively can be further developed in an advantageous manner, since the advantages of the connecting device described above also apply in this case.

The support structure and, in particular, the guiding device of the main forces can accordingly be designed in numerous ways.

The individual variants can be implemented in practice for example, in that suitable tubes, rods and/or profiles, preferably of high-grade steel, are welded to one another with the aid of junction plates.

An alternative method of production provides that the tubes, rods and/or profiles, preferably of high-grade steel, are welded or secured by adhesion to junction plates and/or plug connectors of plastics material or aluminium.

With respect to a further possibility of manufacture it is proposed that tubes, rods and/or profiles of high-strength steel, such as for example dual phase steel or TRIP steel, should be welded and/or secured by adhesion with the aid of junction plates and plug connectors.

In addition, it is possible to connect the individual structural braces of the support structure or the guiding device of the main forces respectively by injection moulding, in that the respective tubes, rods and/or profiles are introduced into a plastics material injection moulding tool for example and in that connecting nodes are injection moulded in a thermoplastic manner in this case.

In addition, aluminium extrusion-moulded profiles can be secured by adhesion to tube connectors of aluminium die castings or of plastics material, GRP-CFRP.

The structural braces can be made versatile with respect to the diameters of the material, wall thicknesses and/or geometry with respect to differing requirements, in particular by hydroforming.

The support structure described here can be supplemented by the application of further structural braces with respect to further components or groups of components, such as armrests, a table or the like in accordance with requirements and in a purposeful manner.

It should be stated once more at this point that the object of the invention is also attained by a vehicle, by a motor vehicle or by a utility motor vehicle which is characterized by a vehicle seat according to the invention in accordance with any one of the features set out here.

It is to be understood that the features of the solutions set out above or in the claims can also optionally be combined in order to be able to implement the advantages in a suitably cumulated manner.

Further advantages, aims and properties of the present invention are explained with reference to the accompanying drawing and the following description, in which vehicle seats with a support structure comprising a guiding device of the main forces with lines of action of the main forces extending substantially vertically are illustrated and described by way of example. In the drawing

Figures 1, 2:
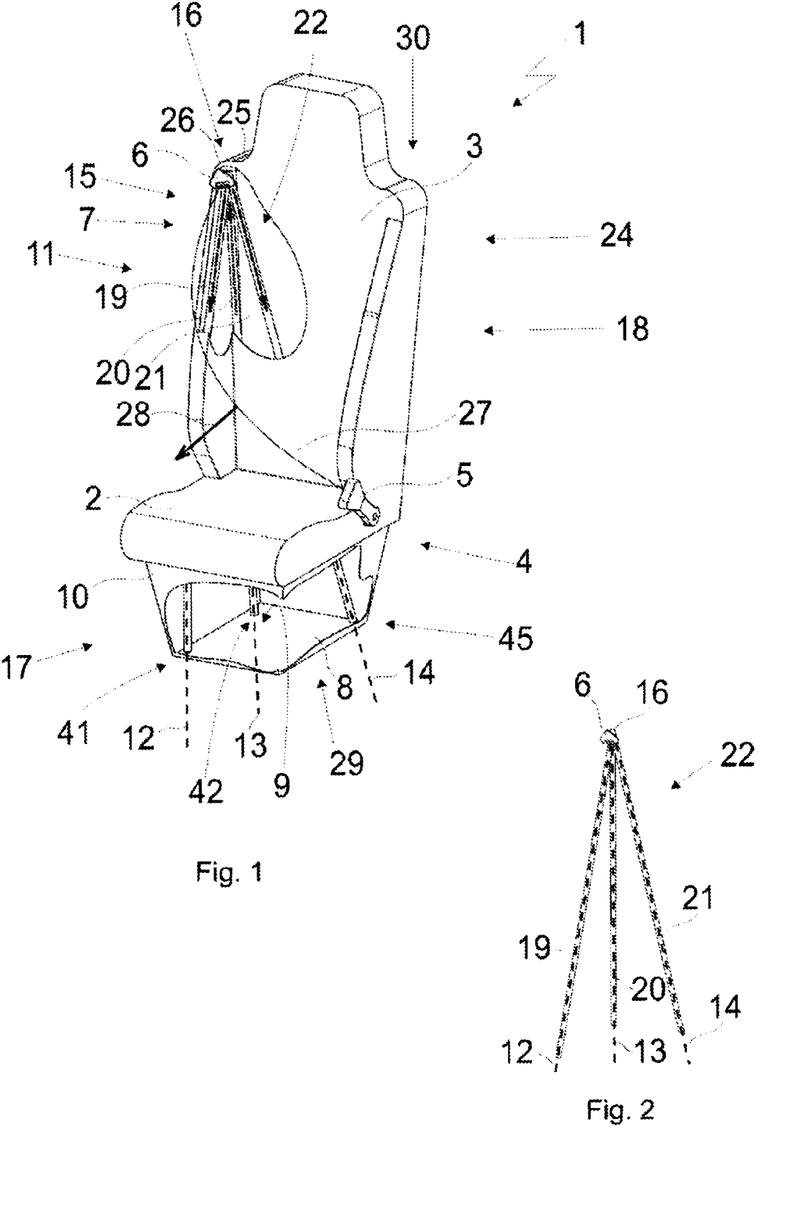
FIG. 1 is a diagrammatic perspective view of a seat of a utility motor vehicle with a simple support structure comprising a guiding device of the main forces with a three-leg framework.
FIG. 2 is a diagrammatic idealized illustration of the three-leg framework as shown in FIG. 1.

The vehicle seat 1 shown in FIG. 1 comprises a seat part 2, a backrest 3 and an integrated belt restraining system 4—illustrated in this case by a belt lock 5 and a belt reversal device 6—for restraining a person (not shown here) sitting on the vehicle seat 1.

The vehicle seat 1 is characterized by a support structure 7 which on one side carries the seat part 2 and the backrest 3.

On the other side the entire vehicle seat 1 can be fastened by means of the support structure 7 to a bodywork component 8 of a utility motor vehicle (not shown in detail here). In this embodiment the utility motor vehicle is a tractor, the bodywork component 8 being the floor of a driver's cab. Below the seat part 2 the vehicle seat 1 is covered with a sheet metal cladding 10.

According to the invention the support structure 7 has a guiding device 11 of the main forces with—in this embodiment—three lines of action 12, 13 and 14 of the main forces extending substantially vertically, by means of which suitable forces acting upon the vehicle seat 1 can be introduced as main forces into the bodywork component 8.

In this case the guiding device 11 of the main forces is designed in such a way that on the top side 15 of the support structure 7 the three lines of action 12, 13 and 14 of the main forces converge in a common junction region 16, as a result of which the guiding device 11 of the main forces has a very compact design.

In contrast, on the underside 17 of the support structure 7 the three lines of action 12, 13 and 14 of the main forces are arranged at a greater distance from one another than in the junction region 16, so that the main forces occurring on the vehicle seat 1 can be introduced in an advantageous manner into the bodywork component 8 over a large area.

In an advantageous manner the guiding device 11 of the main forces has an asymmetrical framework 18 which is produced in a manner reduced in weight only by a first main force brace 19, a second main force brace 20 and a third main force brace 21.

In this respect the guiding device 11 of the main forces in this embodiment is formed essentially by a three-leg framework 22 which is designed in a simple manner and which, despite the simple and light design in terms of weight, provides a very stable support structure 7.

The first main force brace 19 is designed in the form of a substantially exclusive thrust brace which in this embodiment is made additionally curved.

In this respect the first line of action 12 of the main forces extends at least in part outside the first main force brace 19.

The first main force brace 19 projects in this case in particular above the seat part 2 as far as in front of the backrest 3 into the region 23 of the vehicle seat 1 in a bulbous manner.

In an advantageous manner the first main force brace 19 is embedded as the first of the main force braces 19, 20 and 21 in a lateral guide device of the vehicle seat 1.

The junction region 16 is situated in the upper third 24 of the support structure 7.

Since the junction region 16 stabilizes a corner region 25 of the vehicle seat 1, it is advantageous for a belt mounting 26 for receiving the belt reversal device 6 to be positioned at the same time in the junction region 16.

In an advantageous manner, when the belt restraining system 4 is activated, for example in the case of an emergency stop or in the event of a head-on accident, belt restraining forces 28 occurring on a belt 27 of the belt restraining system 4 can be transmitted directly into the guiding device 11 of the main forces and can be immediately further introduced into the bodywork component 8.

In this respect other components of the vehicle seat 1 are not stressed or are stressed less strongly by the belt restraining forces 28, as a result of which these components can be designed in a less solid manner. As a result, a further reduction in weight is achieved on the vehicle seat 1.

While the first main force brace 19 extends from the junction region 16 to a front support structure foot 41 on the side of the junction region, the second main force brace 20 extends behind the seat part 2, starting from the junction region 16, downwards to a first rear support structure foot 42 likewise on the side of the junction region.

This second main force brace 20 acts as a tension brace of the support structure 7, in particular in the event of a crash.

The third main force brace 21 is positioned transversely behind the seat part as viewed in the sitting direction and it extends downwards, starting from the junction region 16, as far as a belt lock side 30 of the vehicle seat 1 facing away from the junction region 16, and it terminates in a further rear support structure foot 45.

This third main force brace 21 acts as a tension/thrust brace of the support structure 7, in particular in the event of a crash.

In this embodiment, on account of the design of the advantageous three-leg framework 22 an additional support brace is also dispensed with below the seat part 2 on the front side 29 of the vehicle seat 1 facing away from the junction region 16 and the belt mounting 26 respectively, as a result of which a further reduction in weight can be achieved.

As shown in FIG. 2, the three-leg framework 22 of FIG. 1 is once again shown in an idealized illustration, in which the first main force brace 19 is a thrust rod, the second main force brace 20 is a tension rod and the third main force brace 21 is a tension/thrust rod, which are combined in the junction region 16.

In this case the first main force brace 19 defines a first line of action 12 of the main forces, the second main force brace 20 a second line of action 13 of the main forces and the third main force brace 21 a third line of action 14 of the main forces of the guiding device 11 of the main forces.

In addition, in an advantageous manner, in this junction region 16 the belt reversal device 6 is fastened to the three-leg framework 22 in a manner optimized with respect to the transmission of forces.

In this respect, by means of the three-leg framework 22 a compact guiding device 11 of the main forces which is light in weight is produced for the support structure 7 of the vehicle seat 1 shown in FIG. 1.

The support structure 107—shown in FIG. 3—of a further vehicle seat 101 comprises a plurality of structural braces 140 which essentially support a seat part 102 and a backrest (not shown here).

In this embodiment the individual structural braces 140 are welded together for the greater part to form an asymmetrical framework 118 of the support structure 107 and consist of a high-grade steel material. The asymmetrical framework 118 is accordingly formed in this embodiment from high-grade steel tubes which are welded together.

By means of the plurality of structural braces 140 a guiding device 111 of the main forces with essentially three lines of action 112, 113, 114 of the main forces is formed on the support structure 107, the three lines of action 112, 113, 114 of the main forces converging in a junction region 116 of the guiding device 111 of the main forces.

The junction region 116 is situated in an upper corner region 125 of the support structure 107.

A belt mounting 126, on which a belt reversal device (not shown here) of a belt restraining system is capable of being fastened, is again provided in the junction region 116. A belt lock 105 of the belt restraining system is again indicated.

In this embodiment the first line of action 112 of the main forces is essentially formed by a first main force brace 119, which stretches in a curve from the junction region 116 to a front support structure foot or a lower first fastening receiving means 141 respectively.

A second curved main force brace 120 forms the second line of action 113 of the main forces, the second main force brace 120 extending in a curved manner from the junction region 116 in the sitting direction as far as a first rear support structure foot or a lower second fastening receiving means 142 respectively.

The third line of action 114 of the main forces is defined by a combined third main force brace 121 which comprises a curved upper part 143 and a triangular lower part 144.

Whilst the curved upper part 143 extends into the junction region 116, the triangular lower part 144 extends into a further rear support structure foot or a third fastening receiving means 145 respectively.

A rear vertical brace 144A of the triangular lower part 144 extends vertically, curved in a bulbous manner in a direction opposed to the sitting direction, into the top side 115 of the support structure 107. There it passes into a horizontally extending structural plane 146 which is arranged transversely to the sitting direction. On the side of the junction region the horizontally extending structural brace 146 curves into a structural brace 147 which is directed downwards and which passes into the second main force brace 120 at the junction region 116. As a result, an extremely good support of the vehicle seat 101 on the rear side of the support structure 107 is provided.

In addition, for the purposes of further stabilization, the triangular lower part 144 has a front vertical brace 144B which is arranged orientated vertically forwards from the further rear support structure foot 145 and, in particular, supports a curved horizontal brace 144C of the triangular arrangement 144.

Since the horizontal brace 144C is also supported by the rear vertical brace 144A, a belt lock side 130 of the vehicle seat 101 also has a highly stable and nevertheless light design.

The curved upper part 143 of the main force brace 121 is thus advantageously supported on the horizontal brace 144C of the triangular lower part 144, which in turn is supported by the rear vertical brace 144A as well as by the front vertical brace 144B.

In addition, the horizontal brace 144C extends in an advantageous manner from the rear vertical brace 144A as far as a further front support structure foot 148 and in this case supports at the same time a vertical support brace 131 of a seat part mounting brace 132 of the support structure 107 which is fastened at the top side 115 to the rear vertical brace 144A and likewise terminates in the further front support structure foot 148.

A cross brace 133 also extends vertically from the seat part mounting brace 132 for the further support of a seat part frame 134 which in a junction point 135 meets with the front vertical brace 144B at the seat part mounting brace 132.

Further to the rear the second main force brace 120 and the rear vertical brace 144A are connected to each other in a stabilizing manner by a lower transverse connecting brace 136.

Starting from this transverse connecting brace 136 at the end, horizontal connecting braces 137 which are preferably designed in the form of a further cross brace extend at one end starting (covered here by the seat part 102) from the second main force brace 120 to the seat part frame 134 and at the other end starting from the rear vertical brace 144A to the seat part frame 134.

The backrest (not shown here) is held by means of an oval brace 138 and a head support (likewise not shown here) is held by means of a U-shaped brace arrangement 139 on the support structure 107.

Figure 5:
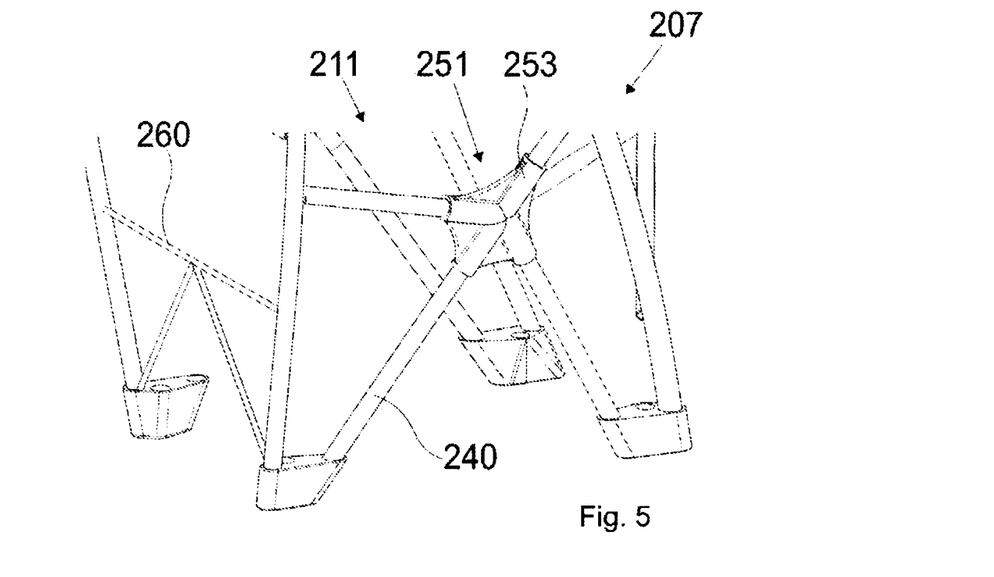
FIG. 5 is a diagrammatic view of a support structure with the connecting device as shown in FIG. 4 with additional thin stabilization braces.

It is to be understood that the support structure 107 described here can be supplemented if necessary by further structural braces 140, as shown by way of example with respect to a further support structure according to FIG. 5.

The further front support structure foot or the further fourth fastening receiving means 148 is not situated on one of the lines of action 112, 113 and 114 of the main forces. In this respect this plays only a subordinate role in the support of the vehicle seat 101 with respect to a bodywork component (not shown here).

In fact, the guiding device 111 of the main forces is formed essentially by a three-leg framework 122 which is supplemented by further structural braces 140 of the support structure 107.

The connecting device 150 shown in FIG. 4 for structural braces (see for example numbers 19, 20, 22 in FIG. 1, or number 140 in FIG. 3) represents a first alternative, in addition to a welded design, of joining individual structural braces to form a support structure.

To this end the connecting device 150 has a junction fitting 151 with four receiving means 152 (numbered only by way of example here). The junction fitting 151 is reinforced with junction plates 153 (numbered only by way of example here) so that the individual receiving means 152 are highly stable with respect to one another.

Each of the receiving means 152 comprises an inner space 154 into which the individual structural braces can be inserted at the end.

A vertical connecting mandrel 155 projects in each case into the inner spaces 154, so that an annular gap 156 or an annular cylinder into which a tube of a structural brace can be inserted is formed in each of the receiving means 152. As a result, a particularly intimate join between the junction fitting 151 and the structural braces can be achieved.

In the case of the support structure 207 which is shown in FIG. 5 and which forms a guiding device 211 of the main forces, individual structural braces 240 are secured to one another with adhesion by a junction fitting 251 of this type. Here too the junction fitting 251 has four receiving means 253 for the insertion of structural braces 240. In this case the structural braces 240 have still smaller bracing aids 260, as can be used in all the present support structures.

Figure 6:
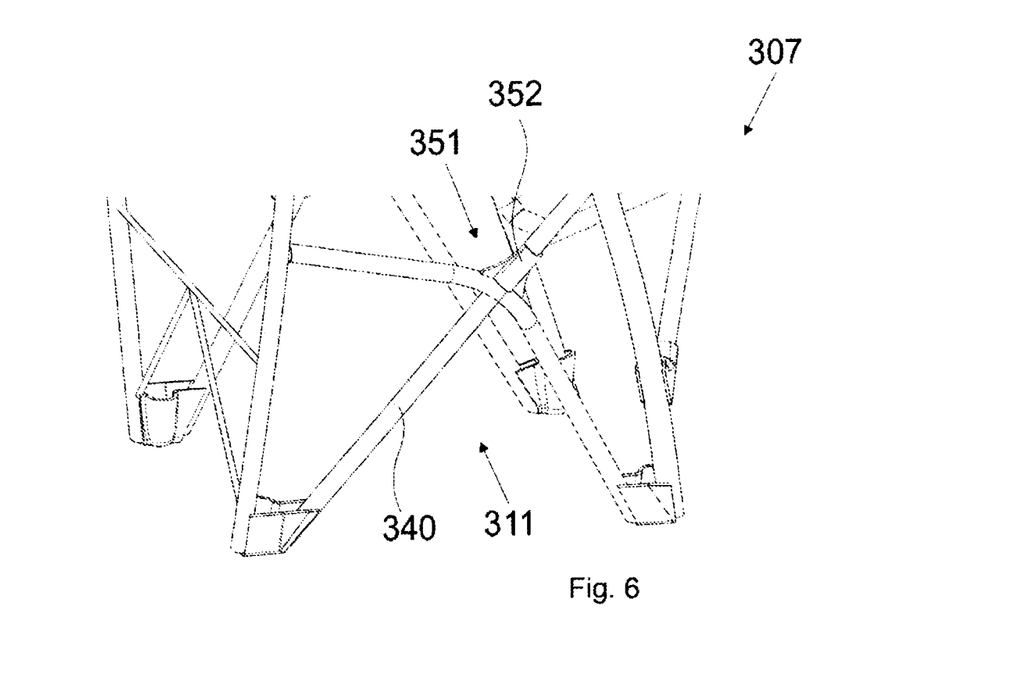
FIG. 6 is a diagrammatic view of a further support structure with an alternative connecting device.

A further variant of a junction fitting 351 of this type connects structural braces 340 of a further support structure 307 shown in FIG. 6 to a guiding device 311 of the main forces. The junction fitting 351 has only three structural-brace receiving means 352.

Figures 7, 8:
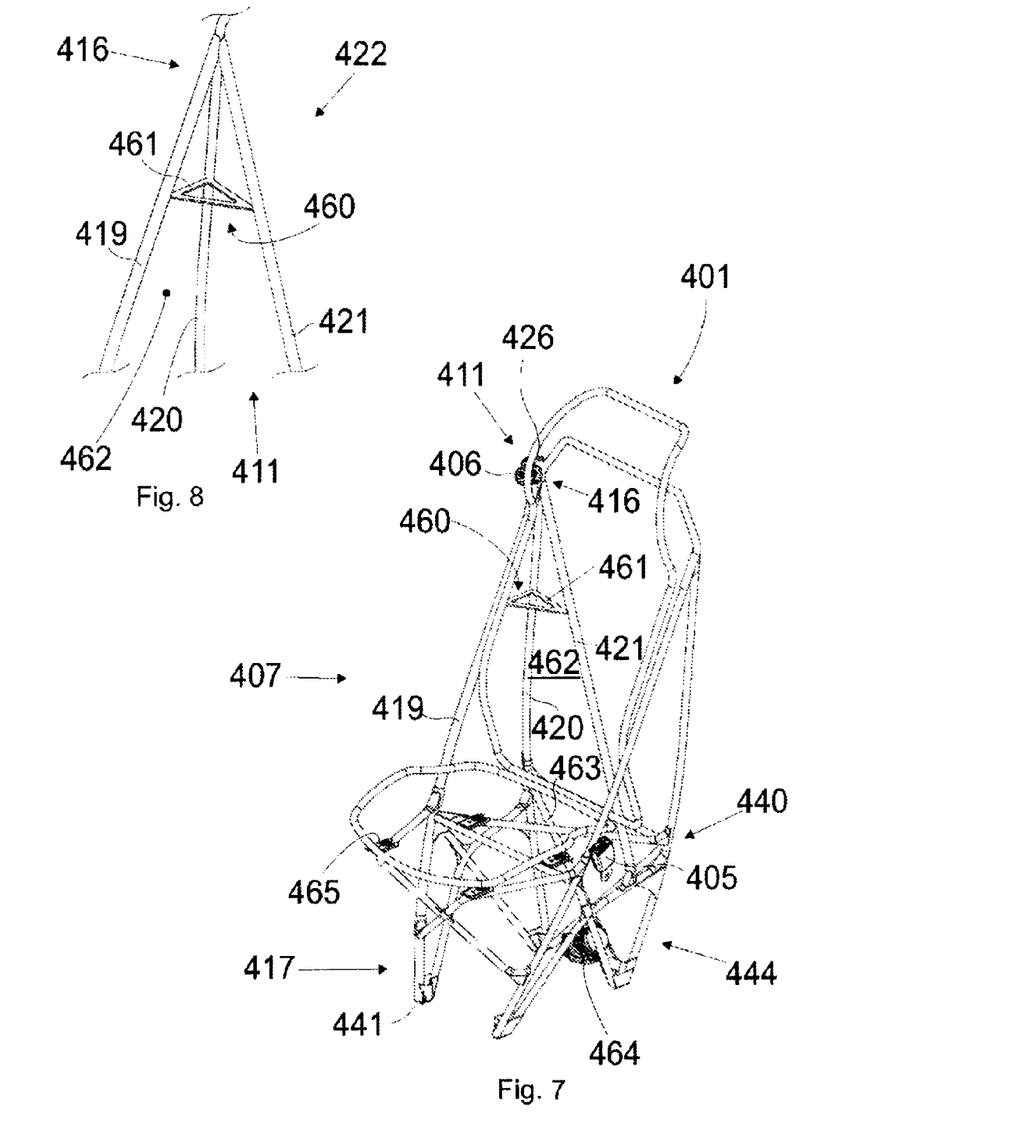
FIG. 7 is a diagrammatic perspective view of a further seat of a motor vehicle with a triangle connection between main force braces.
FIG. 8 is a diagrammatic detailed view of the triangle connection as shown in FIG. 7.

The support structure 407—shown in FIG. 7—of a further vehicle seat 401 resembles in particular the support structure 107 of the vehicle seat 101 of FIG. 3 in design, so that for the sake of easy visualization not all the components need to be numbered again or explained once more, so as also to avoid repetition.

In this respect the vehicle seat 401 has an asymmetrical framework 418 which is produced from high-grade steel tubes and which comprises a guiding device 411 of the main forces stamped out in the form of a three-leg framework 422.

Accordingly, the asymmetrical framework 418 has a first main force brace 419, a second main force brace 420 and a third main force brace 421, which run into a junction region 416 on the top side 415 of the vehicle seat 401, and are connected to one another.

On the underside 417 of the vehicle seat 401 the main force braces 419, 420 and 421 diverge further from one another and are connected to one another indirectly at least in part by means of a plurality of further structural braces 440 of the support structure 407.

In contrast to the embodiments described above, a triangle connection 460 is additionally set up between the main force braces 419, 420 and 421, so that the individual main force braces 419, 420, 421 are once more additionally directly connected to one another in an operative manner immediately below the junction region 416. As a result, a pressure stressing—occurring in particular in the event of a crash—of the first, forward main force brace 419 is reduced in an advantageous manner, since forces in this respect are distributed at least in part to the two further, rear main force braces 420 and 421.

As a result, the first main force brace 419 can be designed to be still lighter structurally, since it is relieved by the other main force braces 420, 421. In an advantageous manner a further reduction in weight on the vehicle seat 401 can be achieved as a result.

In addition, the triangle connection 460 results in a shortening of the thrust rod—which is formed by the first main force brace 419—of the three-leg framework 422, so that the risk of buckling of the first main force brace 419 can be reduced once more. In this respect the support structure 407 has an additionally more stable design and is additionally more secure in the event of a vehicle crash.

The triangle connection 460 in this case is positioned in an advantageous manner above a seat part frame 434 and, in particular, in a region 461 behind a backrest (not shown here) of the vehicle seat 401. In this way, the length—measured from a first fastening receiving means 441 of the support structure 407—of the region of the first main force brace 419 at risk from buckling can be reduced in an effective manner.

The triangle connection 460 in this embodiment is formed by a triangular sheet metal frame 461 which is situated in a space volume 462 formed by the three main force braces 419, 420 and 421. The triangular sheet metal frame 461 is welded to each of the three main force braces 419, 420, 421.

In addition, the support structure 407 is braced in a similar manner to the support structure 107 of FIG. 3, in which case a rear connecting brace 463, which extends transversely between the second main structural brace 420 and a lower part 444 of the third main structural brace 421 and to which a belt store 464 of a belt restraining system 404 is thus fastened in an advantageous manner, is also additionally provided here.

In this way, restraining forces acting upon the belt store 464 can be introduced in a particularly advantageous manner into the support structure 407 and in the vicinity of a support structure fastening means. In an advantageous manner the latter produces low torques which have to be absorbed by the support structure 407, for example in the event of a vehicle crash. As a result, the support structure 407 is loaded less heavily and it can be lighter in design in terms of weight. In this respect a deep fastening of the belt store 464 provided in the support structure 407 is advantageous even without the other features of the invention.

The belt restraining system 404 in this embodiment is visualized by a belt lock 405 and a belt reversal device 406, the latter being suspended on a belt mounting 426 of the support structure 407. In this way, the belt restraining system 404 is integrated completely in the vehicle seat 401 in this embodiment as well.

In the embodiment four seat part fastening means 465 (numbered only by way of example) for fastening a seat part (not shown here) of the vehicle seat 401 to the support structure 407 may also be seen.

It is to be understood that the embodiments explained above are only first arrangements of the invention. In this respect the arrangement of the invention is not restricted to these embodiments.

Certain features disclosed in the application are understood to be novel, including for example, features either individually or in combination with other features as compared with the prior art.

LIST OF REFERENCES 1 vehicle seat
2 seat part
3 backrest
4 belt restraining system
5 belt lock
6 belt reversal device
7 support structure
8 bodywork component
9 floor of the driver's cab
10 sheet metal cladding
11 guiding device of the main forces
12 first line of action of the main forces
13 second line of action of the main forces
14 third line of action of the main forces
15 top side
16 junction region
17 underside
18 asymmetrical framework
19 first main force brace
20 second main force brace
21 third main force brace
22 three-leg framework
23 seat region
24 upper third
25 corner region
26 belt mounting
27 belt
28 belt restraining forces
29 front side facing away
30 belt lock side
41 front support structure foot
42 rear support structure foot
45 further rear support structure foot
101 vehicle seat
102 seat part
105 belt lock
107 support structure
111 guiding device of the main forces
112 first line of action of the main forces
113 second line of action of the main forces
114 third line of action of the main forces
115 top side
116 junction region
118 asymmetrical framework
119 first main force brace
120 second main force brace
121 third main force brace
122 three-leg framework
125 corner region
126 belt mounting
130 belt lock side
131 vertical support brace
132 seat part mounting brace
133 cross brace
134 seat part frame
135 junction point
136 transverse connecting brace
137 horizontal connecting brace
138 oval brace
139 brace arrangement
140 structural braces
141 first fastening receiving means
142 second fastening receiving means
143 upper part
144 lower part
144A rear vertical brace
144B front vertical brace
144C horizontal brace
145 third fastening receiving means 146 horizontal structural plane
147 structural brace
148 fourth fastening receiving means
150 connecting device
151 junction fitting
152 receiving means
153 junction plates
154 inner space
155 connecting mandrel
156 annular gap
207 support structure
211 guiding device of the main forces
240 structural braces
251 junction fitting
252 receiving means
260 bracing aids
307 support structure
311 guiding device of the main forces
340 structural braces
351 junction fitting
352 receiving means
401 vehicle seat
405 belt lock
406 belt reversal device
407 support structure
411 guiding device of the main forces
415 top side
416 junction region
418 asymmetrical framework
419 first main force brace
420 second main force brace
421 third main force brace
422 three-leg framework
426 belt mounting
444 lower part
460 triangle connection
461 triangular sheet metal frame
462 space volume
463 connecting brace
464 belt store
465 seat part fastening means

What is claimed is:

1. A vehicle seat comprising a seat part, a backrest and a support structure for supporting the seat part as well as the backrest, in which the support structure is capable of being fastened to a bodywork component and in which forces acting upon the vehicle seat by means of the support structure are capable of being introduced into the bodywork component, wherein the support structure has an asymmetrical framework with main force braces extending substantially vertically, in which on a top side of the support structure the main force braces converge in a junction region and on an underside of the support structure a first one of the main force braces is arranged on a side of the junction region as a thrust brace guided forwards as far as a front foot of the support structure, a second one of the main force braces is arranged on the side of the junction region as a tension brace at a rear of the support structure guided as far as a first rear foot of the support structure and a third one of the main force braces is arranged as a tension/thrust brace at the rear guided as far as a further rear foot of the support structure, wherein the third main force brace is arranged supported on a side of the further rear support structure foot on a triangle arrangement comprising further support structure braces, wherein a rear vertical brace of the triangle arrangement extends from the further rear support structure foot as far as the junction region and merges into the second main force brace at the junction region.

2. The vehicle seat according to claim 1, wherein the first main force brace is arranged above the seat part extending to in front of the backrest and is arranged laterally on or adjacent to the seat part.

3. The vehicle seat according to claim 1, wherein the first main force brace is curved and is made bulbous in a sitting direction.

4. The vehicle seat according to claim 1, wherein the second main force brace is arranged behind the seat part and is made bulbous in a sitting direction.

5. The vehicle seat according to claim 1, wherein the third main force brace is arranged transversely behind the seat part as viewed in a sitting direction.

6. The vehicle seat according to claim 1, wherein a front vertical brace of the triangle arrangement is arranged orientated vertically towards a front from the further rear support structure foot and supports a horizontal brace of the triangle arrangement.

7. The vehicle seat according to claim 1, wherein a horizontal brace of the triangle arrangement extends from a rear vertical brace of the triangle arrangement as far as a further front foot of the support structure.

8. The vehicle seat according to claim 1, wherein the junction region comprises a holding device for a belt mounting.

9. A vehicle seat comprising a seat part, a backrest and a support structure for supporting the seat part as well as the backrest, in which the support structure is capable of being fastened to a bodywork component and in which forces acting upon the vehicle seat by means of the support structure are capable of being introduced into the bodywork component, wherein the support structure has a guiding device of the main forces with at least first, second and third main force braces extending substantially vertically and with lines of action of the main forces extending substantially vertically, in which on a top side of the support structure the lines of action of the main forces extending substantially vertically are arranged converging in a junction region of the guiding device of the main forces and on an underside of the support structure are arranged at a further distance from one another than in the junction region, in which the main force braces have different cross-sectional profiles.

10. The vehicle seat according to claim 9, wherein the first main force brace is arranged above the seat part extending to in front of the backrest and is arranged laterally on or adjacent to the seat part.

11. The vehicle seat according to claim 9, wherein the first main force brace is curved and is made bulbous in a sitting direction.

12. The vehicle seat according to claim 9, wherein the second main force brace is arranged behind the seat part and is made bulbous in a sitting direction.

13. The vehicle seat according to claim 9, wherein the third main force brace is arranged transversely behind the seat part as viewed in a sitting direction.

* * * * *